United States Patent
Franovic

(10) Patent No.: US 10,078,504 B1
(45) Date of Patent: Sep. 18, 2018

(54) AUTOMATED SOFTWARE INTERNATIONALIZATION AND LOCALIZATION

(71) Applicant: Amazon Technologies, Inc., Seattle, WA (US)

(72) Inventor: Tin Franovic, Dublin (IE)

(73) Assignee: Amazon Technologies, Inc., Seattle, WA (US)

(*) Notice: Subject to any disclaimer, the term of this patent is extended or adjusted under 35 U.S.C. 154(b) by 185 days.

(21) Appl. No.: 14/856,011

(22) Filed: Sep. 16, 2015

(51) Int. Cl.
*G06F 9/44* (2018.01)
*G06F 8/41* (2018.01)
*G06F 8/30* (2018.01)

(52) U.S. Cl.
CPC . *G06F 8/42* (2013.01); *G06F 8/31* (2013.01)

(58) Field of Classification Search
CPC ... H04L 69/329; H04L 67/34; H04N 5/44543; G05B 15/02
See application file for complete search history.

(56) References Cited

U.S. PATENT DOCUMENTS

| | | | |
|---|---|---|---|
| 9,582,294 B1* | 2/2017 | Self | G06F 9/454 |
| 2004/0167768 A1* | 8/2004 | Travieso | G06F 17/289 |
| | | | 704/2 |
| 2008/0288239 A1* | 11/2008 | Bailey | G06F 17/248 |
| | | | 704/2 |
| 2011/0113327 A1* | 5/2011 | Hagelund | G06F 9/4448 |
| | | | 715/265 |
| 2011/0126169 A1* | 5/2011 | Moore | G06F 8/51 |
| | | | 717/106 |
| 2013/0254752 A1* | 9/2013 | Nair | G06F 8/51 |
| | | | 717/137 |

OTHER PUBLICATIONS

Wenlin Peng et al., Automation technique of software internationalization and localization bsed on lexical analysis, ACM, 2009, retrieved online on Jun. 1, 2018, pp. 970-974. Retrieved from the Internet: <URL: http://delivery.acm.org/10.1145/1660000/1656101/p970-peng.pdf?> (Year: 2009).*

* cited by examiner

*Primary Examiner* — Hanh Thi-Minh Bui
(74) *Attorney, Agent, or Firm* — Lee & Hayes, PLLC

(57) ABSTRACT

Technologies are disclosed herein for automated software internationalization and localization. In particular, an internationalization and localization ("I&L") network service is disclosed that provides functionality for automating the process of internationalizing and localizing software. Program source code can be submitted to the I&L network service for internationalization and localization. Hard coded text strings in the source code can be automatically identified, such as through the use of static analysis of the program source code, and translated into different human readable languages specified by a software developer. The hard coded text strings in the source code can be replaced by program code, such as method calls, for obtaining the translated text strings at run time. The I&L service can also be utilized in conjunction with a deployment service for automated internationalization, localization, and deployment of program code.

16 Claims, 9 Drawing Sheets

AUTOMATED SOFTWARE INTERNATIONALIZATION AND LOCALIZATION

BACKGROUND

Software internationalization (commonly referred to as "i18n") is the process of designing a software application so that it can be adapted to various languages and geographic regions without additional engineering changes. Software localization (commonly referred to as "l10n") is the process of adapting internationalized software for a specific geographic region or language by adding locale-specific components and translated text. Many aspects of software internationalization and localization are currently performed manually and, therefore, software internationalization and localization can be a complex, time consuming, error-prone and expensive process.

The disclosure made herein is presented with respect to these and other considerations.

DETAILED DESCRIPTION

Figure 1:
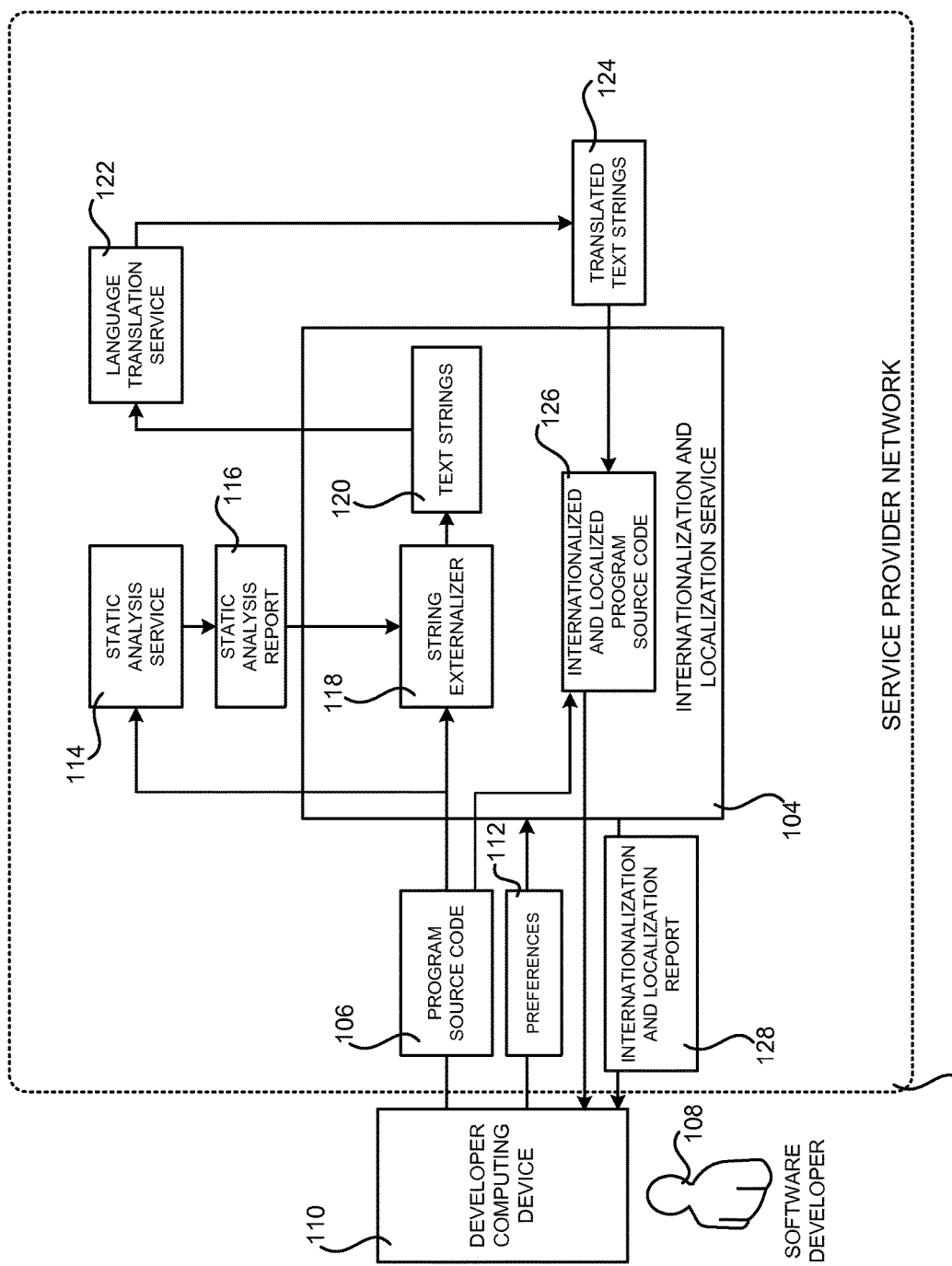
FIG. 1 is a system architecture diagram showing aspects of the configuration and operation of an internationalization and localization service configured to provide functionality for automated software internationalization and localization, according to one configuration disclosed herein.

The following detailed description is directed to technologies for automated software internationalization and localization. Through an implementation of the disclosed technologies, software internationalization and localization can be performed in a substantially automated fashion. As a result, software internationalization and localization can be performed more easily, faster, with fewer errors, and at a lower cost than currently possible. Additional technical benefits other than those described briefly above can also be realized through an implementation of the technologies disclosed herein.

In order to enable the functionality disclosed herein, an internationalization and localization ("I&L") service is provided in one configuration. The I&L service is a network service that can execute in a service provider network that is configured to provide computing resources on a permanent or an as-needed basis. Among other types of functionality, the computing resources provided by the service provider network can be utilized to implement the various network services described herein. The computing resources provided by the service provider network can include various types of computing resources, such as data processing resources like virtual machine instances, data storage resources, networking resources, data communication resources, network services, and the like.

The I&L service disclosed herein exposes an interface, such as a Web services interface, through which software developers can request internationalization and localization of program source code. In particular, a software developer can utilize a suitable computing device to provide a properly formatted request to the I&L service to internationalize and localize program source code. The request can include the program source code (or a reference to the location of the source code), along with data identifying the human readable language used to express text strings in the source code and data identifying one or more other human readable languages into which the text strings are to be translated. The request might also include data specifying whether statistical machine translation or human translators are to be used to perform the translation of text strings found in the source code. The request might also specify other preferences regarding the manner in which the program source code is to be internationalized and localized such as, but not limited to, a minimum level of quality for machine performed translations of text strings found in the source code and/or an indication as to whether deployment is to be performed even if I&L issues exist within the program source code.

In response to receiving such a request, the I&L service is configured to identify hard coded text strings in the program source code. In one particular configuration, for example, the I&L service utilizes a static analysis service to perform static analysis on the program source code to identify the hard coded text strings. Other mechanisms can also be utilized to identify the hard coded text strings in the program source code.

Once the hard coded text strings have been identified, the hard coded text strings can be translated into the human readable language, or languages, specified by the software developer in the request. In one particular configuration, for example, a statistical machine translation network service can be utilized to translate the text strings utilizing statistical machine translation. In another configuration, a network service can be utilized to translate the strings that provides functionality for facilitating the translation of the text strings by human translators. Other mechanisms might also be utilized to translate the text strings into the human readable language, or languages, specified by the software developer.

In order to enable usage of the translated text strings, occurrences of the hard coded text strings in the source code are replaced with program code for retrieving a corresponding translated text string. For example, and without limitation, the hard coded text strings can be replaced by method calls for obtaining a corresponding translated text string at run time. Other mechanisms can also be utilized to obtain the translated text strings at run time. Once the text strings have been translated and the occurrences of the text strings in the source code have been replaced by program code for obtaining the translated strings, the internationalized and localized program source code can be returned to the software developer in a reply to the original request.

In some configurations, the I&L service is also configured to identify other types of internationalization and localization issues in the program source code and to provide a report to the software developer identifying the issues. For example, and without limitation, the I&L service can utilize a static analysis service to identify locale sensitive methods or static file references in the program source code. The reply to the request to perform internationalization and localization on the program source code can include a report that describes the identified issues to the software developer. The software developer can then utilize this information to modify the source code to address the issues.

In some configurations, the I&L service operates in conjunction with a deployment service that is configured to deploy program code to computing resources within the service provider network, such as virtual machine instances. In this configuration, the deployment service receives the program source code and causes the program source code to be internationalized and localized in the manner described above. The deployment service can also cause the internationalized and localized program source code to be compiled and to deploy the compiled executable program to computing resources in the service provider network. In this way, software internationalization, localization, and deployment can be automated through the use of network services.

In some configurations, the I&L service is further configured to determine whether the program source code has one or more internationalization or localization issues that cannot be automatically remedied. For example, and without limitation, the I&L service might utilize a static analysis service to determine if the program source code has locale sensitive methods or static file references. If the program source code has any such internationalization or localization issues, the deployment service will not compile the program source code or deploy the program.

Similarly, a software developer might specify a value defining a threshold level of quality for machine performed translations of text strings in the program source code. If the actual quality of the machine performed translations does not meet the threshold value specified by the developer, then the I&L service will not compile the program source code or deploy the program. Other types of issues, errors, or conditions in the program source code or the translations of the text strings might also result in the deployment service failing to deploy the program code.

If internationalization or localization issues are found in the program source code or if the translations are not of a suitable quality, a status message can be provided to the software developer identifying the issues. The software developer can then address the issues in the program source code and resubmit the revised program source code for internationalization, localization and, potentially, deployment in the manner described briefly above. Additional details regarding the various components and processes described briefly above for automated software internationalization and localization will be presented below with regard to FIGS. 1-9.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a system architecture diagram showing aspects of the configuration and operation of a service provider network 102 and an I&L service 104 configured to execute therein. As discussed briefly above, the service provider network 102 is a computing network configured to provide computing resources on a permanent or an as-needed basis. Among other types of functionality, the computing resources provided by the service provider network 102 can be utilized to implement the various network services described herein, such as the I&L service 104. The computing resources provided by the service provider network 104 can include various types of computing resources, such as data processing resources like virtual machine ("VM") instances, data storage resources, networking resources, data communication resources, network services, and the like.

A customer or potential customer of the service provider network 102 can utilize an appropriate computing system, such as the developer computing device 110, to communicate with the service provider network 102 over an appropriate data communications network (not shown in FIG. 1). In this way, a customer of the service provider network 102 can configure various aspects of the operation of the computing resources provided by the service provider network 102, or to otherwise control any computing resources being utilized by the customer.

For example, and without limitation, a computing system utilized by a customer of the service provider network 102, such as the developer computing device 110, might be utilized to purchase computing resources in the service provider network 102, to configure aspects of the operation of the computing resources through a management console (not shown in FIG. 1) or other type of interface, to access and utilize functionality provided by the various services and systems described herein, and/or to perform other types of functionality with regard to the operation of the computing resources provided by the service provider network 102.

The developer computing device 110 can be any type of computing device capable of connecting to the service provider network 102 via a suitable data communications network such as, but not limited to, a laptop or desktop computer, a tablet computing device, a server computer, or a smartphone. Administrative users employed by the operator of the service provider network 102, such as administrators managing the operation of the service provider network 102, might also connect with, manage, and utilize resources provided by the service provider network 102 in a similar fashion. Additional details regarding the configuration and operation of the service provider network 102 will be provided below with regard to FIGS. 6-9.

As discussed briefly above, the service provider network 102 might also be configured to execute various types of network services. For example, and without limitation, the service provider network 102 can execute the internationalization and localization ("I&L") service 104 shown in FIG. 1. As discussed briefly above, the I&L service 104 is a network service that can execute in the service provider network 102 in one particular configuration. The I&L service 104 exposes an interface, such as a Web services interface, through which a software developer 108 can request internationalization and localization of program source code 106. In particular, the software developer 108 can utilize the developer computing device 110 to provide a properly formatted request to the I&L service 104 to internationalize and localize program source code 106. The program source code 106 can be JAVA source code, C or C++ source code, or another type of computer program source code.

The request submitted to the I&L service 104 can include the program source code 106 or a reference to the location of the program source code 106. The request can also include preferences 112 that include data identifying the human readable language (e.g. English or French) used to express text strings in the program source code 106. The preferences 112 can also include data identifying one or more other human readable languages (e.g. German or Italian) into which the text strings in the program source code 106 are to be translated. The preferences 112 can also include data specifying whether statistical machine translation or human translators are to be used to perform the translation of the text strings in the program source code 106. The request might also specify other preferences 112 regarding the manner in which the program source code 106 is to be internationalized and localized such as, but not limited to, a minimum level of quality for machine performed translations of the text strings in the program source code 106 and/or an indication that deployment is to be performed even if I&L issues exist in the program source code 106.

In response to receiving such a request, the I&L service 104 is configured to identify hard coded text strings in the program source code. For instance, text strings utilized in user interfaces ("UIs") that are presented to an end user can be identified. In one particular configuration, for example, the I&L service 104 utilizes a static analysis service 114 to perform static analysis on the program source code 106 to identify any hard coded text strings contained therein. As known to those skilled in the art, static analysis, which might also be called static code analysis, refers to a process of analyzing program code without executing it. Other mechanisms can also be utilized to identify the hard coded text strings in the program source code 106 in other configurations.

The static analysis service 114 can return a static analysis report 116 that includes data identifying the results of the static analysis. For example, and without limitation, the static analysis report 116 can identify the locations of the hard coded text strings within the program source code 106. The static analysis report 116 can also identify other types of internationalization and localization issues identified within the program source code 106. For example, the static analysis report 116 can identify locale sensitive methods in the program source code 106. Locale sensitive methods are methods that are dependent upon a particular locale and which, therefore, might not be suitable for use by end users in another locale. Examples include, but are not limited to, methods for sorting data, methods for processing keyboard shortcuts, methods for processing or displaying times, dates, or currency values, methods for formatting strings, and methods for encoding text.

The static analysis report 116 can also identify the location in the program source code 106 of static file references. Static file references can present an internationalization or localization issue when the referenced file contains locale dependent information. For example, and without limitation, a static file reference can reference a graphical image that includes locale dependent content. Other types of locale dependent information can be contained in files referenced by static file references in the program source code 106. In this regard, it should be appreciated that the static analysis service 114 can identify other types of internationalization and localization issues in the program source code 106 in other configurations. These issues can also be identified in the static analysis report 116.

Once the static analysis service 114 has identified the location of the hard coded text strings in the program source code 106, a string externalizer 118 can extract the located text strings 120 from the program source code 106. The extracted text strings 120 can be stored as a JAVA resource file, as a properties file, or in another manner. The extracted text strings 120 can then be translated into the human readable language, or languages, specified by the software developer 108 in the request. In one particular configuration, for example, a language translation service 122 is utilized to translate the text strings 120 into the translated text strings 124. The language translation service 122 can be a statistical machine translation network service configured to translate the text strings 120 into the translated text strings 124 utilizing statistical machine translation methods. In another configuration, the language translation service 122 can provide functionality for facilitating the translation of the text strings 120 into the translated text strings 124 by human translators (not shown in FIG. 1). Other mechanisms might also be utilized to translate the text strings 120 into translated text strings 124 in the human readable language, or languages, specified by the software developer 108.

In order to enable usage of the translated text strings 124, the I&L service 104 replaces occurrences of the text strings 120 in the program source code 106 with program source code for retrieving a corresponding translated text string 124. For example, and without limitation, the text strings 120 in the program source code 106 can be replaced by method calls for obtaining a corresponding translated text string 124 at run time from a resource file. In another configuration, the text strings 120 in the program source code 106 can be replaced by method calls for obtaining a corresponding translated text string 124 at run time from the language translation service 122. In this configuration it is not necessary to translate the text strings in the program source code 106 prior to run time. Other mechanisms can also be utilized to obtain the translated text strings 124 at run time.

Once the text strings 120 have been translated and the occurrences of the text strings 120 in the program source code 106 have been replaced by program source code for obtaining the corresponding translated strings 124, the internationalized and localized program source code 126 can be returned to the developer computing device 110 in a reply to the original request to perform internationalization and localization of the program source code 106. The developer can then compile, deploy and execute the internationalized and localized program source code 126.

As discussed briefly above, in some configurations the static analysis service 114 is also configured to identify other types of internationalization and localization issues in the program source code 106 and to provide a static analysis report 116 to the I&L service 104 identifying the issues. For example, and as mentioned above, the static analysis service 114 can be configured to identify locale sensitive methods or static file references in the program source code 106. In this configuration, the reply to the request to perform internationalization and localization on the program source code 106 can include an I&L report 128 that describes the identified issues in the program source code 106, such as locale specific methods or static file references. The software developer 108 can then utilize this information to modify the program source code 106 to address the issues. Other types of information can also be provided to the software developer 108 in a similar fashion. Additional details regarding this process will be provided below with regard to FIGS. 2 and 3.

Figure 2:
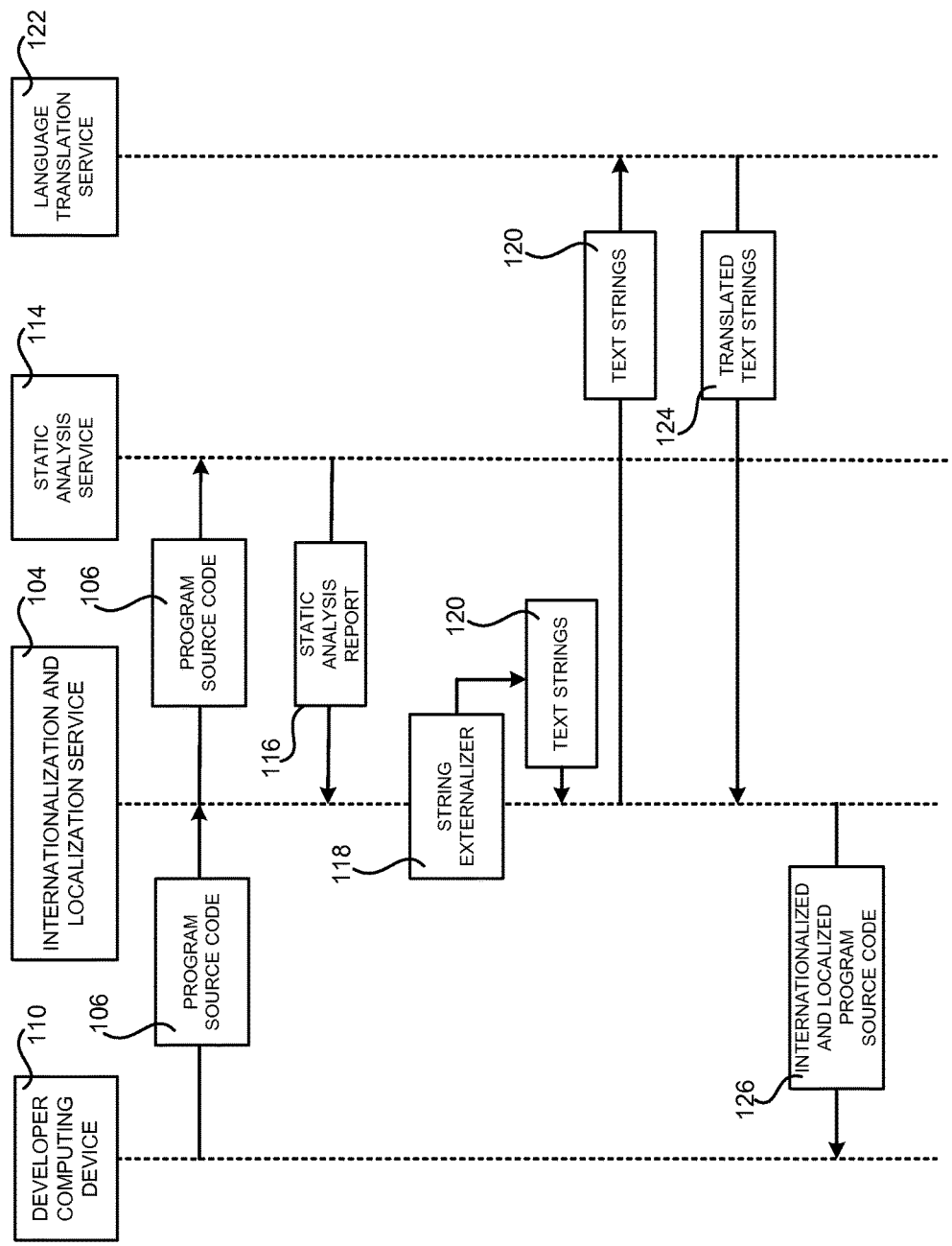
FIG. 2 is a data flow and timing diagram showing aspects of the operation of the internationalization and localization service shown in FIG. 1, according to one configuration disclosed herein.

FIG. 2 is a data flow and timing diagram showing additional aspects of the operation of the I&L service 104 shown in FIG. 1, according to one configuration disclosed herein. As shown in FIG. 2 and described briefly above, the developer computing device 110 can be utilized to submit program source code 106 to the I&L service 104 for internationalization and localization. In turn, the I&L service 104 submits the program source code 106 to the static analysis service 114 in one particular configuration. As discussed above, the static analysis service 114 performs static analysis on the program source code 106 to identify hard coded strings in the program source code 106. The static analysis service 114 can also identify other types of internationalization and localization issues in the program source code 106 including, but not limited to, locale specific methods and static file references. The static analysis service 114 can provide a static analysis report 116 to the I&L service 104 that identifies the location of the hard coded text strings and, potentially, other localization and internationalization issues.

Once the static analysis service 114 has identified the hard coded text strings in the program source code 106, the string externalizer 118 can extract the text strings 120 from the program source code 106. The extracted text strings 120 can then be provided to the language translation service 122 for translation into the human readable languages identified by the software developer 108 in the original request to the I&L service 104. As discussed above, the language translation service 122 can utilize statistical machine translation to translate the text strings. Alternately, the language translation service 122 can facilitate the translation of the text strings 120 by human translators. For example, and without limitation, the language translation service 122 might present a text string 120 to a human translator in a suitable UI. The human translator can then translate the text string 120 and provide the translated text string 124 back to the language translation service 122. Other types of translation mechanisms can be utilized in other configurations.

The I&L service 104 receives the translated text strings 124 from the language translation service 122. The I&L service 104 then replaces occurrences of the text strings 120 in the program source code 106 with program source code, such as method calls, for obtaining the translated text strings 124. In this manner, the translated text strings 124 can be retrieved at run time and utilized in the same manner (e.g. displayed) as the original hard coded text strings 120. Other mechanisms can also be utilized to obtain the translated text strings 124 at run time. Once the text strings 120 have been replaced with program code for retrieving the translated text strings 124, the internationalized and localized program source code 126 can be returned to the developer computing device 110 in a reply to the original request submitted to the I&L service 104 or in another fashion.

Figure 3:
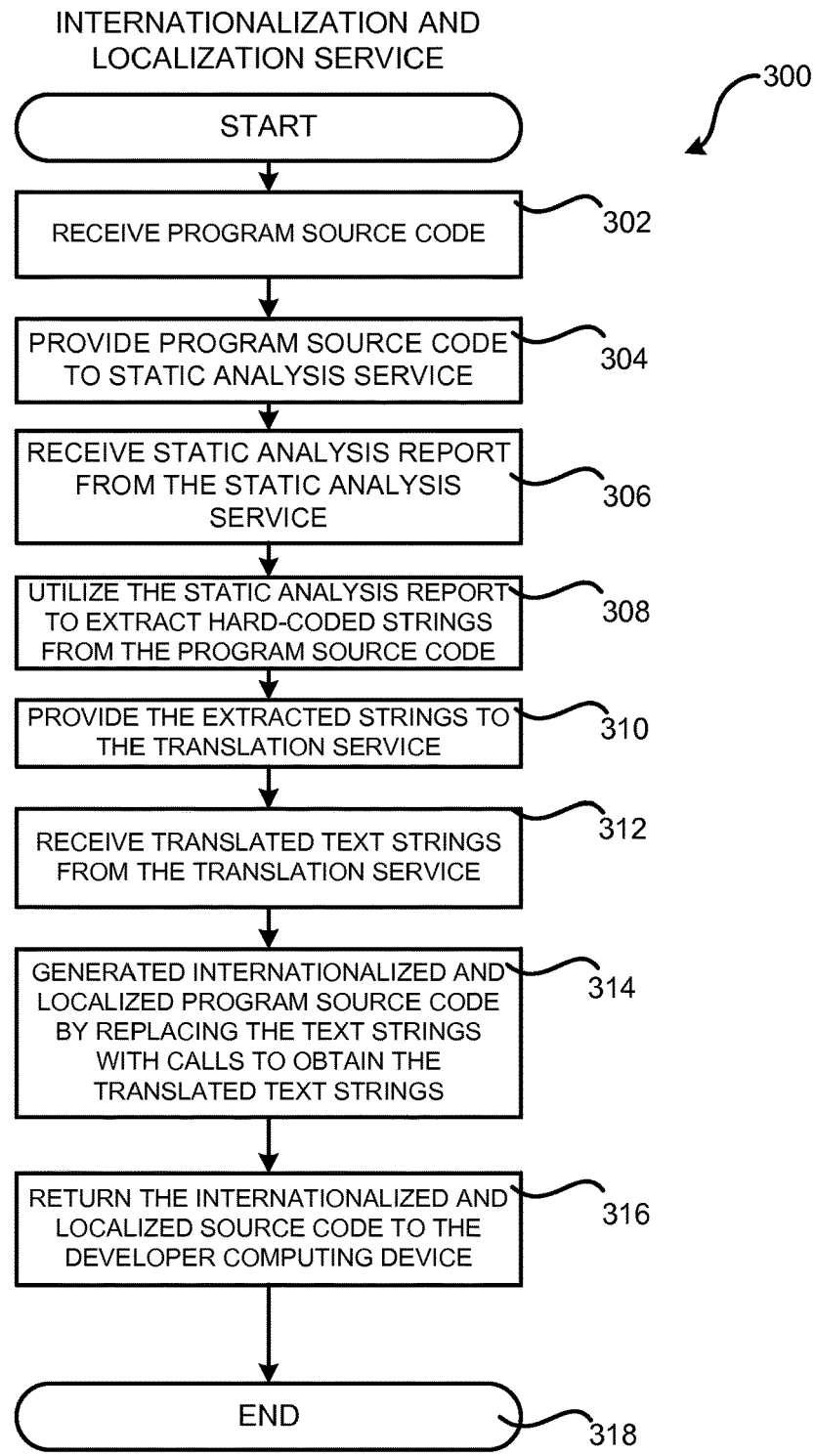
FIG. 3 is a flow diagram showing a routine that illustrates further aspects of the operation of the internationalization and localization service shown in FIG. 1, according to one particular configuration disclosed herein.

FIG. 3 is a flow diagram showing a routine 300 that illustrates further aspects of the operation of the internationalization and localization service 104, according to one particular configuration disclosed herein. It should be appreciated that the logical operations described herein with respect to FIG. 3, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations might also be performed by components other than those specifically identified.

The routine 300 begins at operation 302, where the I&L service 104 receives the program source code 106. The routine 300 then proceeds to operation 304, where the I&L service 104 provides the program source code 106 to the static analysis service 114 for analysis. As described above, the static analysis service 114 can perform static analysis on the program source code 106 to identify the location of hard coded text strings in the program source code, to locate locale specific methods, to locate static file references, and to locate other types of program code that present internationalization or localization issues.

From operation 304, the routine 300 proceeds to operation 306, where the I&L service 104 receives the static analysis report 116 from the static analysis service 114. As discussed above, the static analysis report 116 includes data identifying the location of hard coded text strings in the program source code 106 and, potentially, data identifying other types of internationalization or localization issues in the program source code 106. The routine 300 then proceeds to operation 308, where the I&L service 104 utilizes the static analysis report 116 to extract the hard coded text strings from the program source code 106.

From operation 308, the routine 300 proceeds to operation 310, where the extracted text strings 120 are provided to the language translation service 122 for translation. As discussed above, statistical machine translation, human translation, or another type of translation can be performed. The software developer 108 can indicate the type of translation to be performed along with the request to perform the internationalization and localization of the program source code 106. At operation 312, the translated text strings 124 are received from the language translation service 122.

From operation 312, the routine 300 proceeds to operation 314, where the I&L service 104 generates the internationalized and localized program source code 126 by replacing the text strings 120 in the program source code 106 with program code for obtaining the corresponding text strings 124. For example, and as mentioned above, the text strings 120 can be replaced by method calls for obtaining the corresponding translated text strings 124 in one particular configuration. Other mechanisms can also be utilized. From operation 314, the routine 300 proceeds to operation 316, where the I&L service 104 returns the internationalized and localized program source code 126 to the developer computing device 110 in a reply to the original request or in another manner. The routine 300 then proceeds from operation 316 to operation 318, where it ends.

Figure 4:
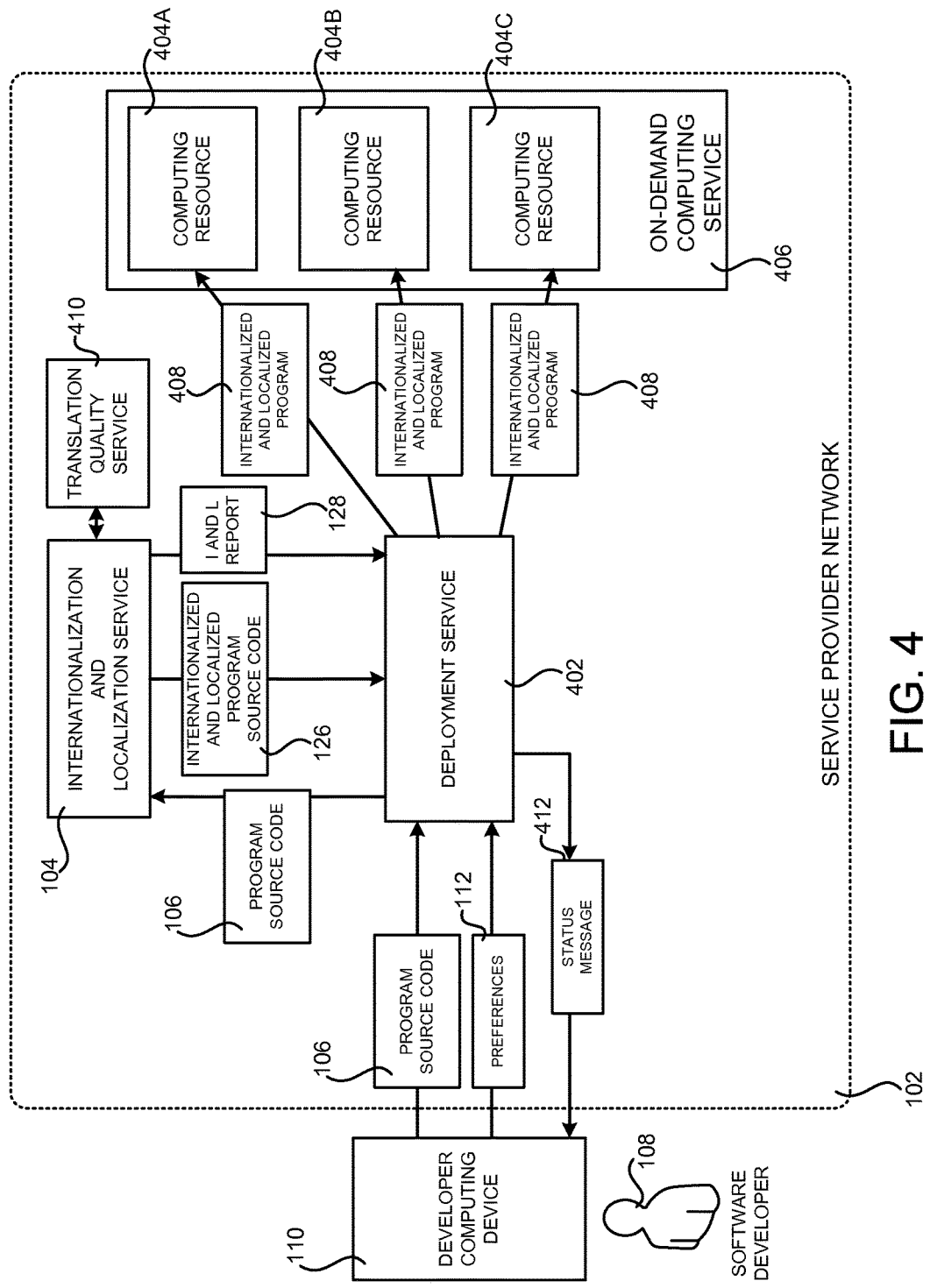
FIG. 4 is a system architecture diagram showing aspects of the configuration and operation of the internationalization and localization service shown in FIG. 1 when utilized in conjunction with a deployment service, according to one configuration disclosed herein.

FIG. 4 is a system architecture diagram showing aspects of the configuration and operation of the internationalization and localization service 104 shown in FIG. 1 when utilized in conjunction with a deployment service 402, according to one configuration disclosed herein. As shown in FIG. 4 and described briefly above, a deployment service 402 can also execute in the service provider network 102 that is configured to deploy executable program code to computing resources 404 within the service provider network 102, such as VM instances.

In the example shown in FIG. 4, an on-demand computing service 406 provides the computing resources 404A-404C. As discussed in greater detail below with regard to FIG. 8, the on-demand computing service 406 can be a collection of computing resources configured to instantiate VM instances and to provide other types of computing resources on demand. For example, a customer or other user of the service provider network 102 can interact with the on-demand computing service 406 (via appropriately configured and authenticated API calls) to provision and operate VM instances that are instantiated on physical computing devices hosted and operated by the service provider network 102. The VM instances can be used for various purposes, such as to operate as servers supporting the network services described herein, a Web site, to operate business applications or, generally, to serve as computing resources for the customer.

In the configuration illustrated in FIG. 4, the deployment service 402 receives the program source code 106 and the preferences 112. The deployment service 402 then causes the program source code 106 to be internationalized and localized in the manner described above. For example, the deployment service 402 can provide the program source code 106 to the I&L service 104. In turn, the I&L service 104 can generate the internationalized and localized program source code 126 in the manner described above with regard to FIGS. 1-3 and return the internationalized and localized program source code 126 to the deployment service 402. The I&L service 104 can also return the I&L report 128 to the deployment service 402, which identifies any detected internationalization and localization issues within the program source code 106. As discussed above, this information can be utilized to determine whether to deploy the program to the computing resources 404 in the service provider network 102.

The deployment service 402 can also cause the internationalized and localized program source code 126 to be compiled into an executable internationalized and localized program 408. For example, a compilation service (not shown in FIG. 4) can be utilized to compile the program source code 106 into an executable format. The deployment service 402 can also deploy the executable internationalized and localized program 408 to the computing resources 404A-404C in the service provider network 102. For example, and without limitation, the executable internationalized and localized program 408 can be deployed to VM instances for execution. In this way, software internationalization, localization, and deployment can be automated through the use of the network services described above.

As discussed above, the I&L service 104 can be configured to determine whether the program source code 106 has one or more internationalization or localization issues that cannot be automatically remedied. For example, and without limitation, the I&L service 104 might utilize the static analysis service 114 to determine if the program source code 106 has locale sensitive methods or static file references. The I&L report 128 can include data identifying such issues. If the program source code 106 has any such internationalization or localization issues, the deployment service 402 will not compile the internationalized program source code 126 or deploy the compiled program. In this way, the deployment service 402 can prevent deployment of program code that has not been properly internationalized or localized.

In a similar fashion, the software developer 108 might specify a value in the preferences 112 that defines a threshold level of quality for machine performed translations of text strings 120 identified in the program source code 106. If the actual quality of the machine performed translations does not meet the threshold value specified by the developer 108, then the deployment service 402 will not compile the internationalized and localized program source code 126 or deploy the compiled program.

In the example shown in FIG. 4, a translation quality service 410 determines the quality of the translated text strings by comparing the translated text strings to reference translations. Other mechanisms can also be utilized to determine the quality of machine translated text. Data indicating the quality of the translated text strings can be provided to the deployment service 402 in the I&L report 128. In this regard, it should be appreciated that other types of issues, errors, or conditions in the program source code 106 or the translated text strings might also result in the deployment service 402 failing to compile or deploy the program source code.

If internationalization or localization issues are found in the program source code 106 or if the translated text strings are not of a suitable quality, a status message 412 can be provided to the developer computing device 110 identifying the issues. The status message 412 might also provide an indication that the deployment service 402 did not compile or deploy the program. Similarly, the status message 412 might also provide an indication of successful compilation and deployment.

If issues exist in the program source code 106, the software developer 108 can then address the internationalization and localization issues in the program source code 106 and resubmit revised program source code for internationalization, localization and, potentially, deployment in the manner described briefly above. Additional detail regarding the mechanism shown in FIG. 4 and described above will be provided below with regard to FIG. 5.

Figure 5:
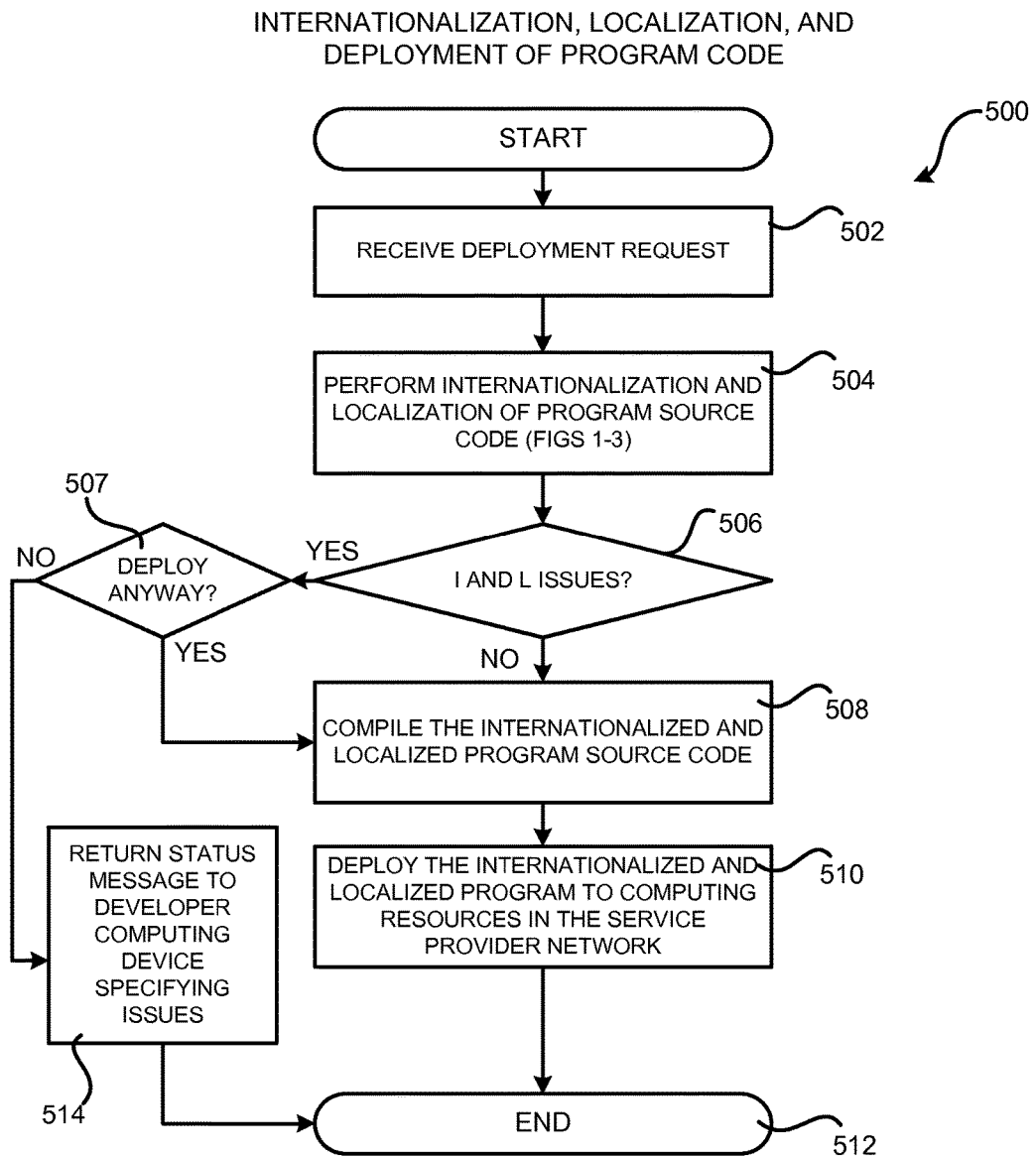
FIG. 5 is a flow diagram showing a routine that illustrates aspects of the configuration and operation of the internationalization and localization service shown in FIG. 1 when utilized in conjunction with a deployment service, according to one configuration disclosed herein.

FIG. 5 is a flow diagram showing a routine 500 that illustrates aspects of the configuration and operation of the internationalization and localization service 104 shown in FIG. 1 when utilized in conjunction with the deployment service 402 shown in FIG. 4, according to one configuration disclosed herein. The routine 500 begins at operation 502, where the deployment service 402 receives a deployment request including the program source code 106 and, potentially, preferences 112 regarding the manner in which the program source code 106 is to be internationalized, localized, and deployed. In response to receiving such a request, the routine 500 proceeds to operation 504, where the deployment service 402 operates in conjunction with the I&L service 104 to internationalize and localize the program source code 106 in the manner described above with regard to FIGS. 1-3.

As discussed above, the I&L service 104 can provide an I&L report 128 to the deployment service 402 indicating whether any internationalization or localization issues exist within the program source code 106. For example, and without limitation, the I&L report 128 can indicate that the program source code 106 includes locale specific methods or static file references. The I&L report 128 can also indicate the quality of the translation of the hard coded text strings contained in the program source code 106. As discussed above, a translation quality service 410 is utilized in one implementation to compute the quality of the translations.

If the I&L report indicates that no internationalization or localization issues are present in the program source code 106, the routine 500 proceeds to operation 508. At operation 508, the deployment service 402, or another service in some configurations, compiles the internationalized and localized program source code 126 generated by the I&L service 104. The executable internationalized and localize program 408 is then deployed to the computing resources 404 in the service provider network 102 for execution. The routine 500 then proceeds from operation 510 to operation 512, where it ends.

If, at operation 506, the deployment service 402 determines that there are internationalization or localization issues in the program source code 106, the routine 500 proceeds from operation 506 to operation 507 where a determination is made as to whether the preferences 112 indicate that deployment is to be performed even if there are internationalization or localization issues in the program source code 106. If so, the routine 500 proceeds from operation 507 to operation 508, described above. If not, the routine 500 proceeds from operation 507 to operation 514, where a status message 412 is returned to the developer computing device 110 indicating that the program source code 106 was not compiled or deployed. As discussed above, the status message 412 can also include data identifying the particular internationalization and localization issues identified in the program source code 106. The routine 500 then proceeds from operation 514 to operation 512, where it ends.

Figure 6:
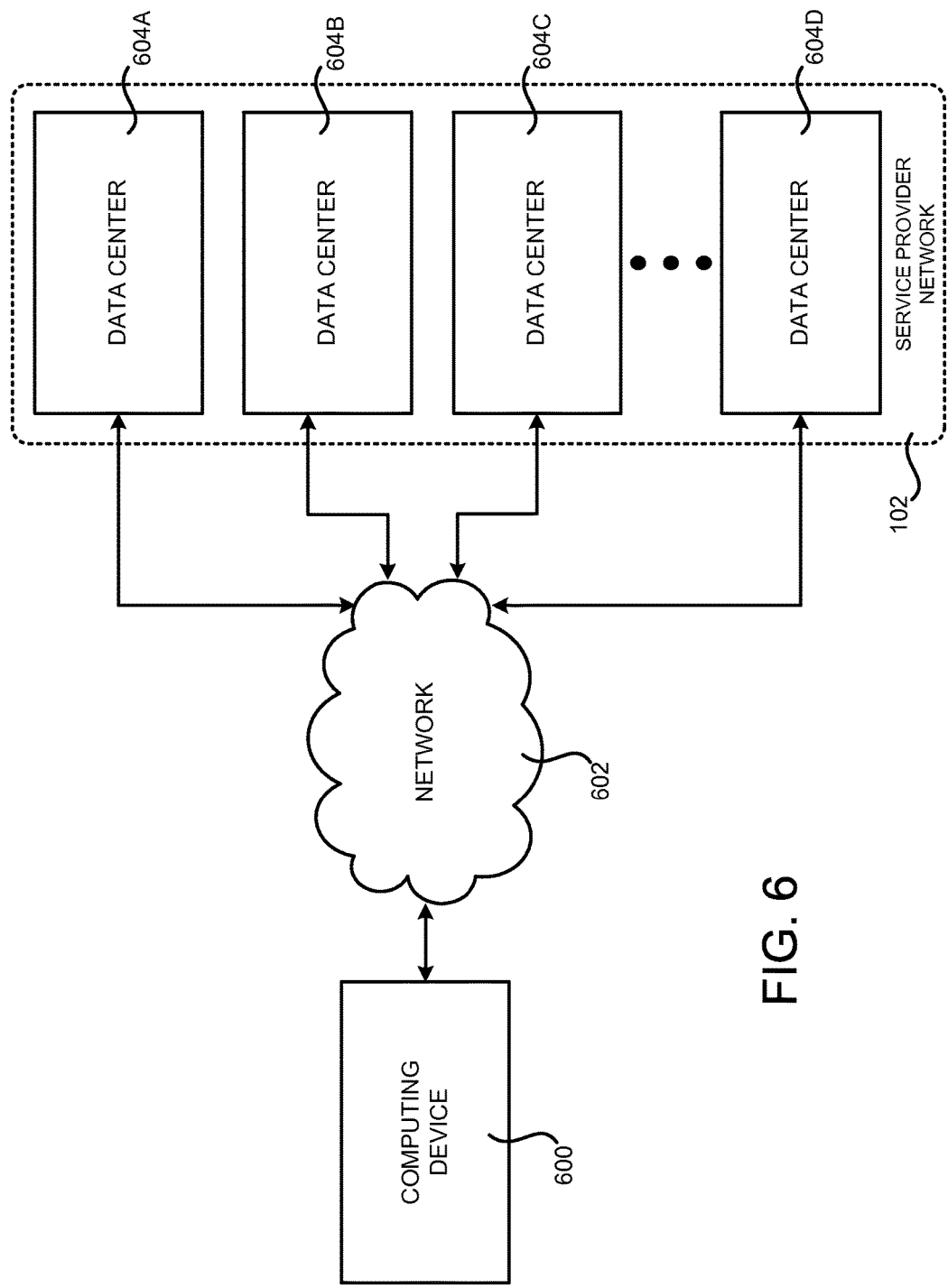
FIG. 6 is a system and network diagram that shows an illustrative operating environment that includes a service provider network that can be configured to implement aspects of the functionality described herein.

FIG. 6 is a system and network diagram that shows one illustrative operating environment for the configurations disclosed herein that includes a service provider network 102 that can be configured to provide functionality for automated software internationalization and localization in the manner described above, according to one configuration disclosed herein. As discussed above, the service provider network 102 can execute network services that provide computing resources on a permanent or an as-needed basis. Among other types of functionality, the computing resources provided by the service provider network 102 can be utilized to implement the various network services described herein. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including Web servers, application servers, media servers, database servers, some or all of the network services described above, and/or other types of programs. Data storage resources can include file storage devices, block storage devices, and the like. The service provider network 102 might also be configured to provide other types of computing resources not mentioned specifically herein.

As also discussed above, the computing resources provided by the service provider network 102 are enabled in one implementation by one or more data centers 604A-604D (which might be referred herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative configuration for a data center 604 that might be utilized to implement the technologies disclosed herein will be described below with regard to FIG. 7.

The customers and other users of the service provider network 102 can access the computing resources provided by the service provider network 102 over a network 602, which can be a wide area communication network ("WAN"), such as the Internet, an intranet or an Internet service provider ("ISP") network or a combination of such networks. For example, and without limitation, a computing device 600 operated by a customer or other user of the service provider network 102, such as the developer computing device 110, might be utilized to access the service provider network 102 by way of the network 602. It should be appreciated that a local-area network ("LAN"), the Internet, or any other networking topology known in the art that connects the data centers 604 to remote customers and other users can be utilized. It should also be appreciated that combinations of such networks might also be utilized.

Figure 7:
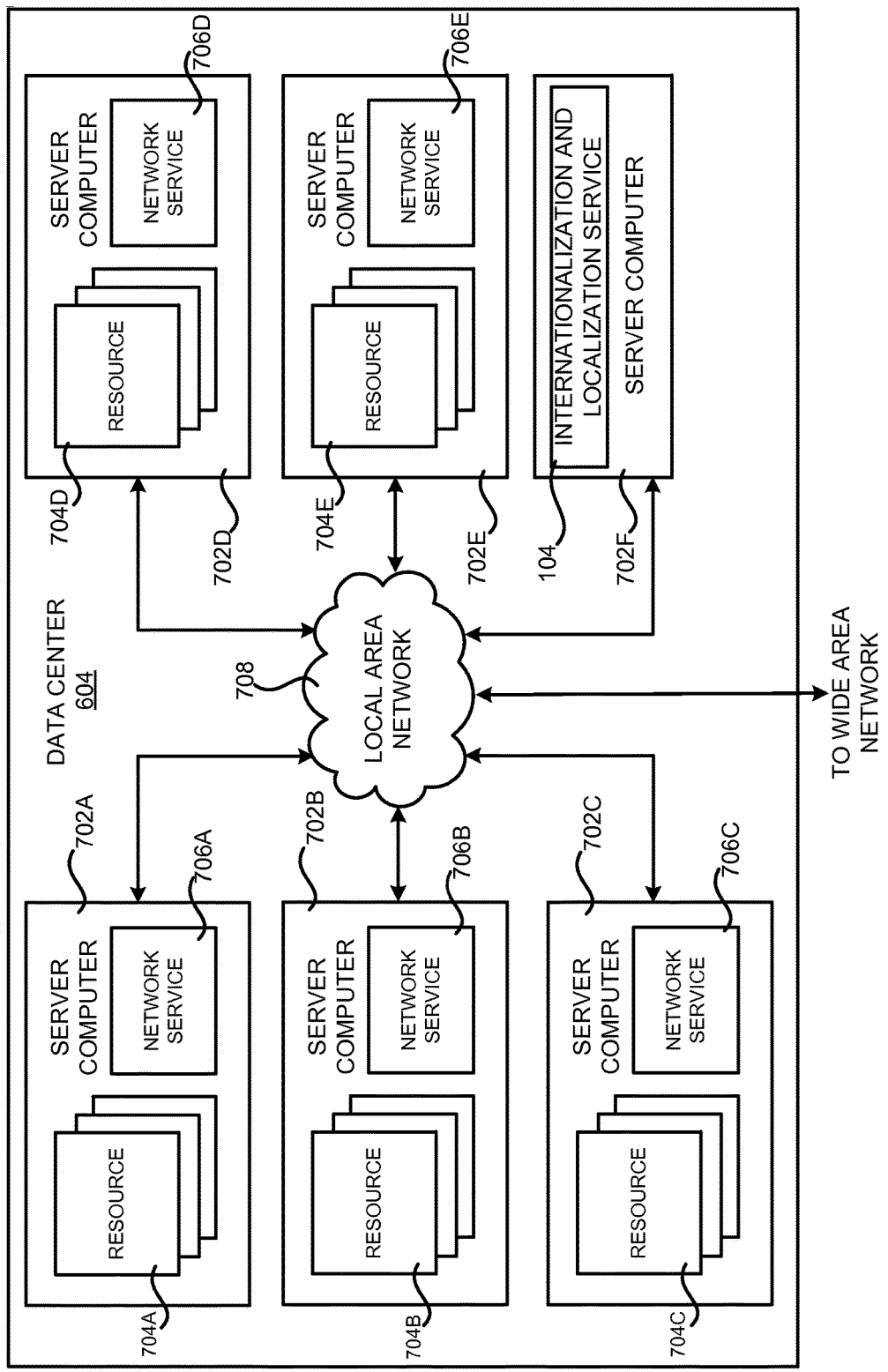
FIG. 7 is a computing system diagram illustrating a configuration for a data center that can be utilized to implement aspects of the technologies disclosed herein.

FIG. 7 is a computing system diagram that illustrates one configuration for a data center 604 that implements aspects of the technologies disclosed herein for automated software internationalization and localization. The example data center 604 shown in FIG. 7 includes several server computers 702A-702F (which might be referred to herein singularly as "a server computer 702" or in the plural as "the server computers 702") for providing the computing resources 704A-704E.

The server computers 702 can be standard tower, rackmount, or blade server computers configured appropriately for providing the computing resources 704 described herein (illustrated in FIG. 7 as the computing resources 704A-704E). As mentioned above, the computing resources 704 provided by the service provider network 102 might be data processing resources such as VM instances or hardware computing systems, data storage resources, database resources, networking resources, and others. Some of the servers 702 might also be configured to execute network services 706A-706E, respectively, capable of instantiating, providing and/or managing the computing resources 704, some of which are described in detail below with regard to FIG. 8.

The data center 604 shown in FIG. 7 also includes a server computer 702F that can execute some or all of the software components described above. For example, and without limitation, the server computer 702F might be configured to execute the internationalization and localization service 104, which was described in detail above. The server computer 702F might also be configured to execute other components and/or to store data for providing some or all of the functionality described herein. In this regard, it should be appreciated that the internationalization and localization service 104 might execute on many other physical or virtual servers in the data centers 604 in various configurations.

In the example data center 604 shown in FIG. 7, an appropriate LAN 708 is also utilized to interconnect the server computers 702A-702F. The LAN 708 is also connected to the network 602 illustrated in FIG. 6. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components might also be utilized for balancing a load between each of the data centers 604A-604D, between each of the server computers 702A-702F in each data center 604, and, potentially, between computing resources 704 in each of the data centers 604. It should be appreciated that the configuration of the data center 604 described with reference to FIG. 7 is merely illustrative and that other implementations might be utilized.

Figure 8:
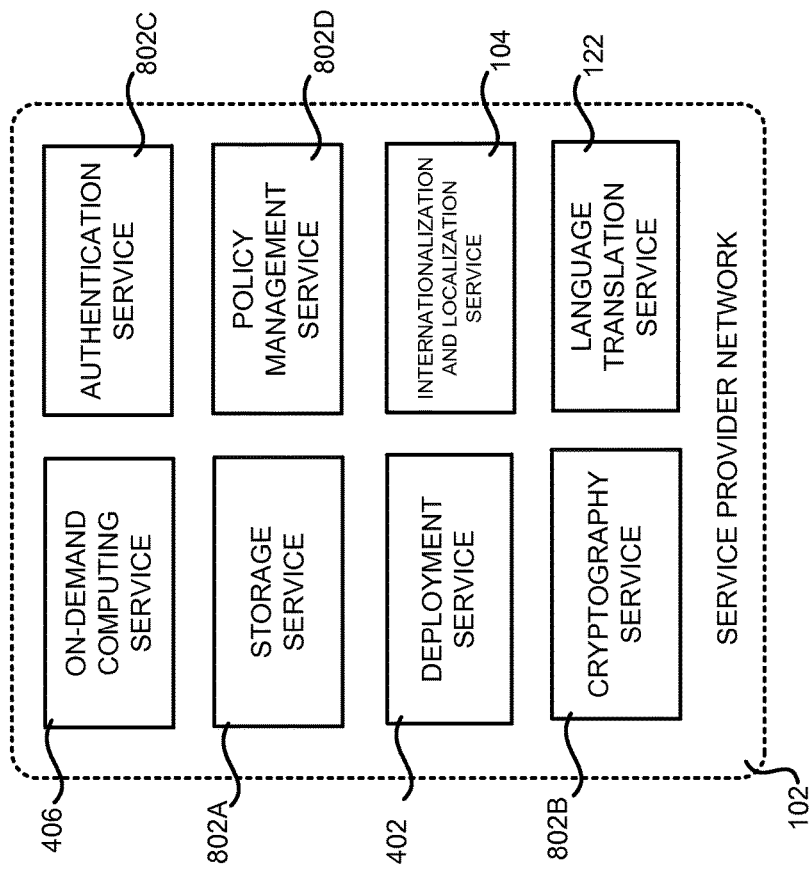
FIG. 8 is a network services diagram that shows aspects of several services that might be provided by and utilized within a service provider network configured to implement the various technologies disclosed herein.

FIG. 8 is a system and network diagram that shows aspects of several network services that might be provided by and utilized within a service provider network 102 in one configuration disclosed herein. In particular, and as discussed above, the service provider network 102 can provide a variety of network services to customers and other users of the service provider network 102 including, but not limited to, the internationalization and localization service 104, the static analysis service 114, the language translation service 122, the translation quality service 410, and the on-demand computing service 406. The service provider network 102 might also provide other types of services including, but not limited to, a storage service 802A, a cryptography service 802B, an authentication service 802C, and/or a policy management service 802D, each of which is described in greater detail below. Additionally, the service provider network 102 might also provide other types of network services, some of which are described in greater detail below.

It should be appreciated that customers of the service provider network 102 can include organizations or individuals that utilize some or all of the services provided by the service provider network 102. As described above, a customer or other user can communicate with the service provider network 102 through a network, such as the network 602 shown in FIG. 6. Communications from a customer computing device, such as the developer computing device 110 shown in FIG. 1, to the service provider network 102 can cause the services provided by the service provider network 102 to operate in accordance with the described configurations or variations thereof.

It is noted that not all configurations described include the services described with reference to FIG. 8 and that additional network services can be provided in addition to or as an alternative to the services explicitly described herein. Each of the services shown in FIG. 8 might also expose Web service interfaces that enable a caller to submit appropriately configured application programming interface ("API") calls to the various services through Web service requests. In addition, each of the services might include service interfaces that enable the services to access each other (e.g., to enable a virtual computer system provided by the on-demand computing service 406 to store data in or retrieve data from the data storage service 802A). Additional details regarding some of the services shown in FIG. 8 will now be provided.

As discussed above, the on-demand computing service 406 can be a collection of computing resources configured to instantiate VM instances and to provide other types of computing resources 704 on demand. For example, a customer or other user of the service provider network 102 can interact with the on-demand computing service 406 (via appropriately configured and authenticated API calls) to provision and operate VM instances that are instantiated on physical computing devices hosted and operated by the service provider network 102. The VM instances can be used for various purposes, such as to operate as servers supporting the network services described herein, a Web site, to operate business applications or, generally, to serve as computing resources for the customer. Other applications for the VM instances can be to support database applications, electronic commerce applications, business applications and/or other applications. Although the on-demand computing service 406 is shown in FIG. 8, any other computer system or computer system service can be utilized in the service provider network 102 to implement the functionality disclosed herein, such as a computer system or computer system service that does not employ virtualization and instead provisions computing resources on dedicated or shared computers/servers and/or other physical devices.

The storage service 802A might include software and computing resources that collectively operate to store data using block or file-level storage devices (and/or virtualizations thereof). The storage devices of the storage service 802A might, for example, be operationally attached to virtual computer systems provided by the on-demand computing service 406 to serve as logical units (e.g., virtual drives) for the computer systems. A storage device might also enable the persistent storage of data used/generated by a corresponding virtual computer system where the virtual computer system service might only provide ephemeral data storage.

The service provider network 102 can also include a cryptography service 802B. The cryptography service 802B can utilize storage services of the service provider network 102, such as the storage service 802A, to store encryption keys in encrypted form, whereby the keys can be usable to decrypt customer keys accessible only to particular devices of the cryptography service 802B. The cryptography service 802B might also provide other types of functionality not specifically mentioned herein.

As illustrated in FIG. 8, the service provider network 102, in various configurations, also includes an authentication service 802C and a policy management service 802D. The authentication service 802C, in one example, is a computer system (i.e., collection of computing resources 704) configured to perform operations involved in authentication of users. For instance, one of the services shown in FIG. 8 can provide information from a user to the authentication service 802C to receive information in return that indicates whether or not the requests submitted by the user are authentic.

The policy management service 802D, in one example, is a network service configured to manage policies on behalf of customers or internal users of the service provider network 102. The policy management service 802D can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 102 can additionally maintain other services based, at least in part, on the needs of its customers. For instance, the service provider network 102 can maintain the deployment service 402 for deploying program code and/or a database service (not shown in FIG. 8) in some configurations. A database service can be a collection of computing resources that collectively operate to create, maintain, and allow queries to be performed on databases stored within the service provider network 102. For example, a customer or other user of the service provider network 102 can operate and manage a database from the database service by utilizing appropriately configured network API calls. This, in turn, can allow the customer to maintain and potentially scale the operations in the database. Other services include object-level archival data storage services, and services that manage, monitor, interact with, or support other services. The service provider network 102 might also be configured with other network services not specifically mentioned herein in other configurations.

Figure 9:
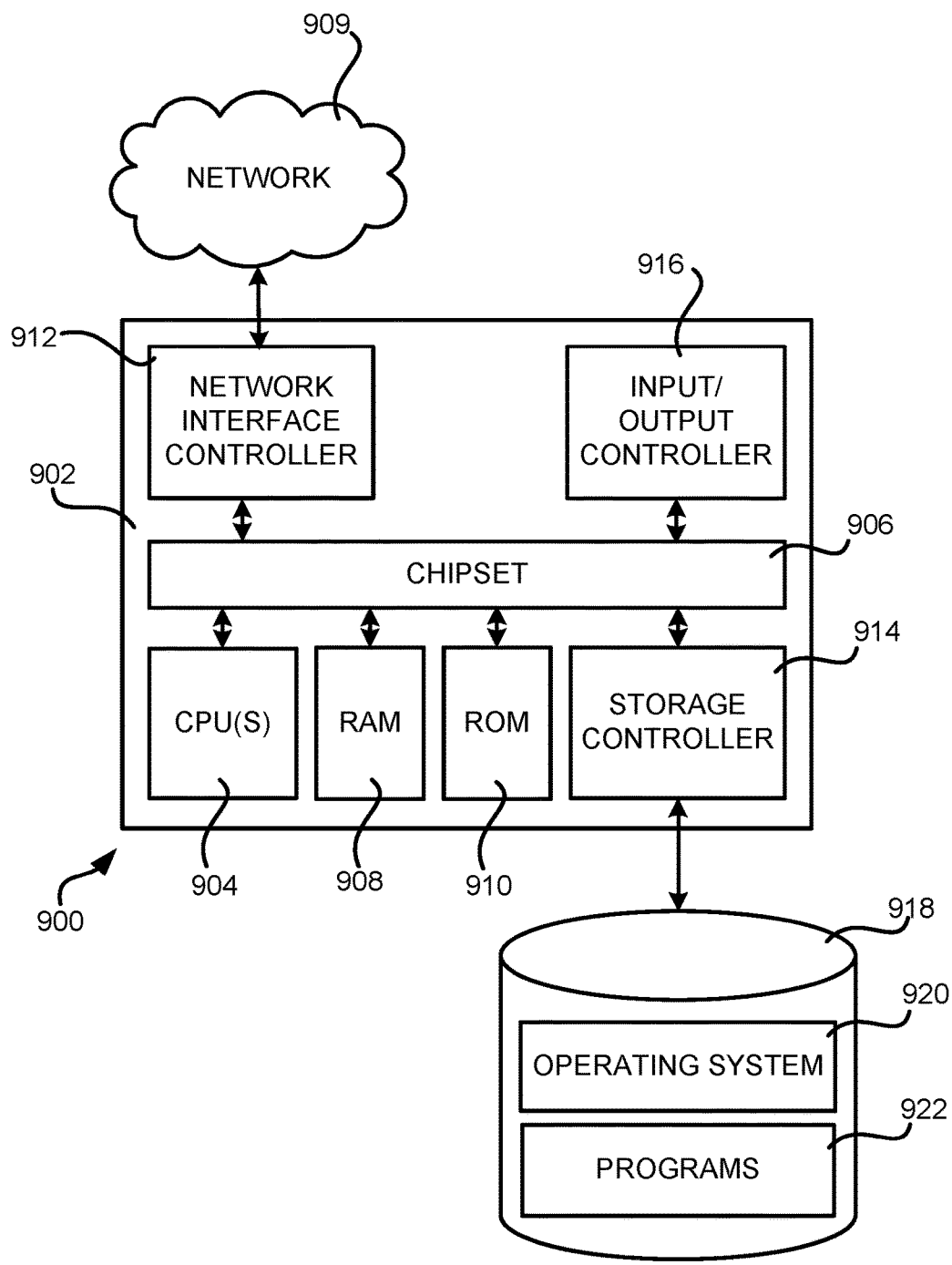
FIG. 9 is a computer architecture diagram showing an illustrative computer hardware architecture for implementing a computing device that might be utilized to implement aspects of the various technologies presented herein.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 909. The chipset 906 can include functionality for providing network connectivity through a NIC 912, such as a gigabit Ethernet adapter. The NIC 912 is capable of connecting the computer 900 to other computing devices over the network 909. It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system 920, programs 922, and data, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system 920 utilized to control the operation of the computer 900. According to one configuration, the operating system comprises the LINUX operating system. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 918 can store other system or application programs and data utilized by the computer 900.

In one configuration, the mass storage device 918 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to one configuration, the computer 900 has access to computer-readable storage media storing computer-executable instructions which, when executed by the computer 900, perform the various processes described above with regard to FIGS. 1-5. The computer 900 might also include computer-readable storage media for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, a plotter, or other type of output device. It will be appreciated that the computer 900 might not include all of the components shown in FIG. 9, can include other components that are not explicitly shown in FIG. 9, or might utilize an architecture completely different than that shown in FIG. 9.

Based on the foregoing, it should be appreciated that technologies for automated software internationalization and localization have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus, comprising:
   a processor; and
   a non-transitory computer-readable storage medium having instructions stored thereupon which are executable by the processor and which, when executed, cause the apparatus to:
   receive a request at a first network service to internationalize and localize program source code,
   responsive to the request, cause a second network service to perform static analysis on the program source code to identify one or more hard coded strings contained in the program source code,
   extract, by way of the first network service, the one or more hard coded strings from the program source code,
   cause a third network service to generate one or more translated text strings by translating the one or more hard coded strings from a first human readable language to at least one second human readable language,
   generate, by way of the first network service, internationalized and localized program source code by replacing the one or more hard coded strings with method calls for obtaining the one or more translated text strings,
   return, by way of the first network service, the internationalized and localized program source code in a reply to the request; and
   cause a fourth network service to compile the internationalized and localized program source code to create an executable internationalized and localized program, and to deploy the executable internationalized and localized program to at least one computing resource operating in a service provider network,
   wherein the request comprises the program source code, data identifying the first human readable language and the at least one second human readable language, data indicating whether statistical machine translation or human translation is to be utilized to generate the translated text strings, and data indicating whether the executable internationalized and localized program is to be deployed even if internationalization or localization issues exist in the program source code.

2. The apparatus of claim 1, wherein the second network service is further configured to identify one or more locale sensitive methods in the program source code or one or more static file references in the program source code, and wherein the reply to the request further comprises data identifying the one or more locale sensitive methods or data identifying the one or more static file references.

3. The apparatus of claim 1, wherein the third network service is configured to generate the one or more translated text strings utilizing statistical machine translation.

4. The apparatus of claim 1, wherein the third network service is configured to generate the one or more translated text strings utilizing human language translators.

5. A computer-implemented method for automated internationalization and localization of program source code, the method comprising:
   receiving a request at a network service to internationalize and localize the program source code; and
   responsive to the request,
      identifying one or more text strings contained in the program source code,
      extracting the one or more text strings from the program source code,
      generating one or more translated text strings by translating the one or more text strings from a first human readable language to at least one second human readable language,
      generating internationalized and localized program source code by replacing the one or more text strings with program code for obtaining the one or more translated text strings,
      returning, by way of the network service, the internationalized and localized program source code in a reply to the request,
      determining whether one or more internationalization or localization issues are present in the program source code,
      responsive to determining that no internationalization or localization issues are present in the program source code, causing the program source code to be compiled to create an executable internationalized and localized program, and causing the internationalized and localized program to be deployed to at least one computing resource operating in a service provider network, and
      responsive to determining that internationalization or localization issues are present in the program source code, determining whether a developer has indicated that the internationalized and localized program is to be deployed even if internationalization or localization issues are present in the program source code, and causing the program source code to be compiled to create an executable internationalized and localized program if the developer has indicated that the internationalized and localized program is to be deployed even if internationalization or localization issues are present in the program source code, and causing the internationalized and localized program to be deployed to at least one computing resource operating in a service provider network.

6. The computer-implemented method of claim 5, further comprising:
   causing the localized program source code to be compiled to create an executable internationalized and localized program; and
   causing the internationalized and localized program to be deployed to at least one computing resource operating in a service provider network.

7. The computer-implemented method of claim 5, further comprising:
   determining whether a quality of the one or more translated text strings meets a threshold value; and
   responsive to determining that the quality of the one or more translated text strings meets the threshold value, causing the program source code to be compiled to create an executable internationalized and localized program, and causing the executable internationalized and localized program to be deployed to at least one computing resource operating in a service provider network.

8. The computer-implemented method of claim 5, wherein the one or more text strings contained in the program source code are identified by a network service configured to perform static analysis on the program source code to identify the one or more text strings.

9. The computer-implemented method of claim 5, wherein the one or more translated text strings are generated by a network service configured to generate the one or more translated text strings utilizing statistical machine translation.

10. The computer-implemented method of claim 5, wherein the one or more translated text strings are generated by a network service configured to generate the one or more translated text strings utilizing human language translators.

11. The computer-implemented method of claim 5, further comprising identifying one or more locale sensitive methods in the program source code or one or more static file references in the program source code, and wherein the reply to the request further comprises data identifying the one or more locale sensitive methods or data identifying the one or more static file references.

12. The computer-implemented method of claim 5, wherein the request comprises the program source code, data identifying the first human readable language and the at least one second human readable language, data indicating whether statistical machine translation or human translation is to be utilized to generate the one or more translated text strings, and data indicating whether the program source code is to be compiled and deployed even if the program source code includes internationalization or localization errors.

13. A non-transitory computer-readable storage medium having instructions stored thereupon which are executable by a processor and which, when executed, cause the processor to:
   receive a request at a network service to internationalize and localize the program source code; and
   responsive to the request,
      extract one or more text strings from the program source code,
      generate one or more translated text strings by translating the one or more text strings,
      generate internationalized and localized program source code by replacing the one or more text strings with program code for obtaining the one or more translated text strings,
      return, by way of the network service, the internationalized and localized program source code in a reply to the request,
      cause the localized program source code to be compiled to create an executable internationalized and localized program, and
      cause the internationalized and localized program to be deployed to at least one computing resource operating in a service provider network.

14. The computer-implemented method of claim 13, wherein the one or more translated text strings are generated by a network service configured to generate the one or more translated text strings utilizing statistical machine translation.

15. The computer-implemented method of claim 13, wherein the one or more translated text strings are generated by a network service configured to generate the one or more translated text strings utilizing human language translators.

16. The computer-implemented method of claim 13, wherein the one or more text strings are identified by a network service configured to perform static analysis on the program source code to identify the one or more text strings.

\* \* \* \* \*